US012162631B2

(12) United States Patent
Freestone et al.

(10) Patent No.: US 12,162,631 B2
(45) Date of Patent: Dec. 10, 2024

(54) PASSIVELY DAMPED END FITTINGS AND BRACKETS

(71) Applicant: MAXAR SPACE LLC, Palo Alto, CA (US)

(72) Inventors: Michael Freestone, Woodside, CA (US); Brian M. Cayton, San Jose, CA (US); John Rappolt, Cupertino, CA (US); Shane Abraham Seiwerts, Fremont, CA (US); Daniel Fluitt, Windsor, CA (US); Kevin Ziemann, Lockeford, CA (US)

(73) Assignee: Maxar Space LLC, Palo Alto, CA (US)

( * ) Notice: Subject to any disclaimer, the term of this patent is extended or adjusted under 35 U.S.C. 154(b) by 402 days.

(21) Appl. No.: 17/124,696

(22) Filed: Dec. 17, 2020

(65) Prior Publication Data
US 2022/0194636 A1 Jun. 23, 2022

(51) Int. Cl.
*B64G 1/64* (2006.01)
*B64G 1/22* (2006.01)

(52) U.S. Cl.
CPC .............. *B64G 1/641* (2013.01); *B64G 1/228* (2023.08)

(58) Field of Classification Search
CPC . B64G 1/641; B64G 2001/228; F16B 7/0413; F16B 7/0446; F16F 1/373; F16F 7/095; F16F 15/126; F16F 2224/025; F16F 7/09
See application file for complete search history.

(56) References Cited

U.S. PATENT DOCUMENTS 4,241,815 A * 12/1980 Federspiel ............ F16F 9/3482
137/493
5,203,435 A * 4/1993 Dolgin .................... F16F 9/306
267/141.2
(Continued)

FOREIGN PATENT DOCUMENTS

| CN | 110035945 | 7/2019 | |
| EP | 1686270 | 8/2006 | |
| FR | 2677723 A1 * | 12/1992 | ............. B64C 27/51 |

OTHER PUBLICATIONS

International Search Report and Written Opinion dated May 12, 2022 in International Patent Application No. PCT/US2021/063706.

*Primary Examiner* — Medhat Badawi
*Assistant Examiner* — Vicente Rodriguez
(74) *Attorney, Agent, or Firm* — Vierra Magen Marcus LLP (57) ABSTRACT

A passively damped mechanical system is disclosed, for example for use in aerospace applications where vibration can adversely affect navigational and operational instruments. In one example, the passively damped mechanical system includes an end fitting of a strut used to connect a structural element to a payload. The end fitting may include outer and inner cylindrical hubs, with a space between the outer and inner cylindrical hub at least partially filled with a viscoelastic material. In a further example, the passively damped mechanical system includes legs used to connect a structural element to a bracket configured to support a payload. Each leg may include a hollow interior having a lattice structure to add strength and a viscoelastic material to provide passive damping.

17 Claims, 7 Drawing Sheets

(56) References Cited

U.S. PATENT DOCUMENTS

| | | | |
|---|---|---|---|
| 5,244,170 A * | 9/1993 | Shekher | F16F 3/026 |
| | | | 244/54 |
| 5,667,204 A | 9/1997 | Slocum | |
| 6,199,801 B1 | 3/2001 | Wilke et al. | |
| 6,290,183 B1 * | 9/2001 | Johnson | F16F 15/02 |
| | | | 267/164 |
| 7,249,756 B1 | 7/2007 | Wilke et al. | |
| 10,041,622 B2 * | 8/2018 | Bullard | F16F 15/046 |
| 10,086,482 B2 * | 10/2018 | Aubert | F16F 3/0873 |
| 10,112,731 B2 | 10/2018 | Rodrigues et al. | |
| 10,227,145 B2 | 3/2019 | Hijmans et al. | |
| 10,457,011 B2 * | 10/2019 | Stewart | B32B 5/10 |
| 11,167,842 B2 * | 11/2021 | Bennett | B64C 27/08 |
| 11,306,794 B2 * | 4/2022 | Whiteford | F16F 15/1292 |
| 2010/0226785 A1 * | 9/2010 | Livingston | E02B 17/0004 |
| | | | 52/745.17 |
| 2014/0084527 A1 | 3/2014 | Johnson et al. | |
| 2015/0198190 A1 | 7/2015 | Carnevali | |
| 2017/0356520 A1 * | 12/2017 | Bauer | F16F 9/063 |
| 2020/0108870 A1 | 4/2020 | Cho et al. | |
| 2020/0114850 A1 | 4/2020 | Faruque et al. | |

* cited by examiner

PASSIVELY DAMPED END FITTINGS AND BRACKETS

BACKGROUND

Vibration and shock load suppression are critically important in aerospace applications, where such vibrations and loads can otherwise adversely affect navigational and operational instruments. It is known to employ passive vibration damping in aerospace applications to reduce vibrational amplitude at resonant frequencies. Passive vibration isolation is also used to prevent transmission of shock between structural elements. Vibration damping and isolation mechanisms are known, but at present, suffer several drawbacks. For example, at present, passive vibration and isolation mechanisms are designed and manufactured early in the design phase for spacecraft components. This makes it very difficult to modify and optimize a system for damping, strength and stiffness, as is often necessary when the spacecraft components are built and tested. Moreover, current passive damping and isolation mechanisms often add a significant amount of weight to the system, adversely adding to the load during liftoff and reentry.

SUMMARY

According to one aspect the present disclosure relates to a passively damped end fitting configured to be mounted on an end of a strut connected between a structural element and a payload. The end fitting in this aspect includes a proximal section configured to fit within an end of the strut and a distal section configured to be coupled to one of the structural element and payload. The proximal section in this aspect includes: an outer hub configured to connect to an end of the strut, an inner hub connected to the distal section, a flexure mount connected between the inner and outer hubs and defining a space between the inner and outer hubs, and a viscoelastic material within at least portions of the space and adhered to the at least portions of the inner and outer hubs.

In another aspect, the present technology relates to a passively damped mechanical structure. The passively damped mechanical structure in this aspect includes: a structural element; a payload; and a strut extending between and connecting the structural element to the payload. The strut may include an end fitting having a proximal section within an end of the strut and a distal section coupled to one of the structural element and payload. The proximal section may include: an outer hub connected to an end of the strut, an inner hub connected to the distal section, a flexure mount connected between the inner and outer hubs and defining a space between the inner and outer hubs; and a viscoelastic material (VEM) within at least portions of the space and adhered to the at least portions of the inner and outer hubs.

In a further aspect, the present technology relates to a passively damped mechanical structure. The passively damped mechanical structure of this aspect includes a structural element; a bracket configured to hold a payload; one or more legs each having a length extending between and connecting the structural element to the bracket, each leg having a wall and a hollow interior. A leg of the one or more legs may include: a lattice structure provided within the hollow interior along at least a portion of the leg; and a viscoelastic material (VEM) provided within the hollow interior along at least a portion of the lattice structure, the VEM adhering to the wall and the lattice structure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate the same or similar elements.

DETAILED DESCRIPTION

In one aspect, technology is described for isolating a first structural element from a second structural element using a passive damping system. In a first embodiment, the passive damping system may be formed within an end fitting of a strut. The strut includes a first end, formed by the end fitting, connected to the first structural element, and a second end connected to the second structural element, which may or may not be formed with a damped end fitting.

The end fitting may have a proximal section affixed within the end of the strut, and a distal section extending from the end of the strut for coupling the end fitting to the second structural element. The proximal section is formed of an outer cylindrical hub and an inner cylindrical hub within and concentric with the outer cylindrical hub. The inner and outer cylindrical hubs are connected to each other by a castellated flexure mount, though other embodiments are possible to create a flexure feature. The space between the first and second cylindrical hubs is filled with a viscoelastic material (VEM) which passively damps vibrations from the strut and provides a second load transmission path from the proximal section to the distal section.

In a second embodiment, the passive damping system may be formed within a bracket for isolating one or more structural elements on the bracket from vibration and shock. The bracket may include support legs affixed to a second structural member. The support legs may each include an internal lattice structure imparting strength and stiffness to the support legs. A VEM may be injected into the support legs, around the lattice structure, to passively damp vibrations within the support legs and to isolate the first structural element from shock and vibration within the support legs.

It is understood that the present technology may be embodied in many different forms and should not be construed as being limited to the embodiments set forth herein. Rather, these embodiments are provided so that this disclosure will be thorough and complete and will fully convey the technology to those skilled in the art. Indeed, the technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

The terms "longitudinal" and "transverse," "top" and "bottom," "upper" and "lower" and "vertical" and "horizontal," and forms and synonyms thereof, as may be used herein are by way of example and illustrative purposes only, and are not meant to limit the description of the technology inasmuch as the referenced item can be exchanged in position and orientation.

For purposes of this disclosure, a connection may be a direct connection or an indirect connection (e.g., via one or more other parts). In some cases, when a first element is referred to as being connected, affixed or coupled to a second element, the first and second elements may be directly connected, affixed or coupled to each other or indirectly connected, affixed or coupled to each other. When a first element is referred to as being directly connected, affixed or coupled to a second element, then there are no intervening elements between the first and second elements.

Figure 1:
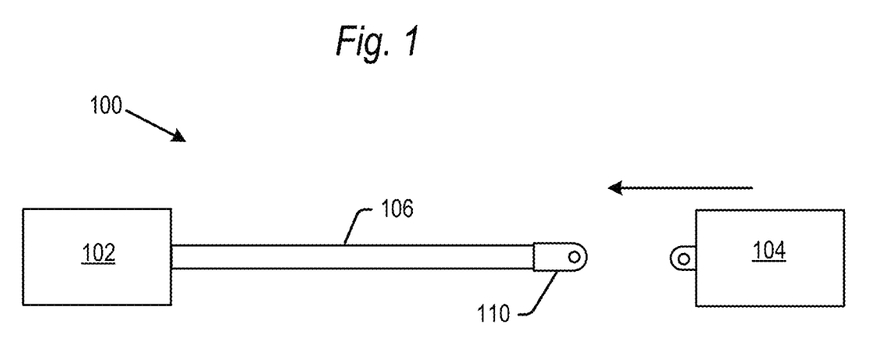
FIG. 1 is a schematic diagram of a first structural element being affixed to a second structural element by a strut having at least one passively damped end fitting.
Figure 2:
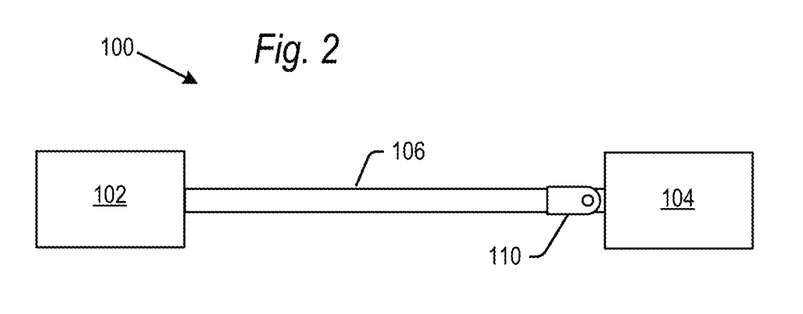
FIG. 2 is a schematic diagram of a first structural element affixed to a second structural element by a strut having a passively damped end fitting.

Referring now to FIGS. 1 and 2, there is shown a system 100 including a first structural element 102 being connected to a second structural element 104 by a strut 106. Both structural elements 102 and 104 are shown schematically and may for example be any of a wide variety of components found in association with the spacecraft. In general, the structural element 102 may be a support surface subject to vibrational and other forces which are transmitted to strut 106. In general, the structural element 104 may include instrumentation or other components which are ideally isolated from the vibrational and/or other forces exerted on structural element 102 and strut 106. In embodiments, structural element 104 may also be referred to herein as payload 104. As one of any of a wide variety of examples, structural element 104 may be a launch vehicle, and the payload 104 may be a spacecraft. In a further example, the payload 104 may be sensitive components or instrumentation mounted and structural element 102 may be a support surface on which the payload is mounted.

In embodiments, the strut 106 may initially be fixedly mounted to structural element 102 as shown in FIG. 1, and thereafter affixed to payload 104 as shown in FIG. 2. The strut 106 may be affixed initially to payload 104 and subsequently to structural element 102 in further embodiments. In general, strut 106 may be a rigid tubular member with a hollow interior along at least portions of its length. However, strut 106 may have cross-sectional shapes other than circular in further embodiments, including for example square, rectangular, triangular and oval. In one example, strut 106 may have a length of 36", and a cross-sectional width of 1". However, strut 106 may have a variety of lengths and cross-sectional widths. In one example, a 1" strut may have a stiffness ~100 kips/in, and strength capability in excess of 5000-lb in compression.

While FIGS. 1 and 2 show the end fitting 110 at an end of strut 106 adjacent the payload 104, the end fitting 110 may be on the end of strut 106 adjacent the structural element 102 in further embodiments. Additional embodiments may have end fittings 110 at both ends of a strut 110. Further, while FIGS. 1 and 2 show a single strut 106 extending between structural element 102 and payload 104, there may be two or more struts 106 extending between the structural element 102 and payload 104 in further embodiments.

In further embodiments, multiple struts 106 may be affixed to each other in series. Such struts may be affixed to each other using a pair of end fittings 110 connected to each other. In further embodiments, one strut may have an end fitting 110 which connects to a conventional coupling of the next attached strut. In further embodiments, the pair of struts may be affixed to each other using any known affixation scheme, including bolting, adhesive bonding, welding and pinning. The end of the last strut 106 in the series may be affixed to a payload 104 via an end fitting 110.

The purpose of strut 106 is to fixedly mount the payload 104 to structural element 102 while isolating payload 104 from vibration and shock from structural element 102 using a passive damping system in the end fitting 110 as explained below. The end fitting 110 may be affixed to one end of strut 106 as also explained below. In embodiments, the end fitting 110 may be pinned to the payload 104 using a pin 112, thus allowing one degree of rotational freedom of the payload 104 relative to the strut 106. In further embodiments, an end fitting 110 may be affixed at both ends of strut 106, so that both structural elements 102 and 104 are fixed to strut 106 by a passively damped end fitting 110.

Figure 3:
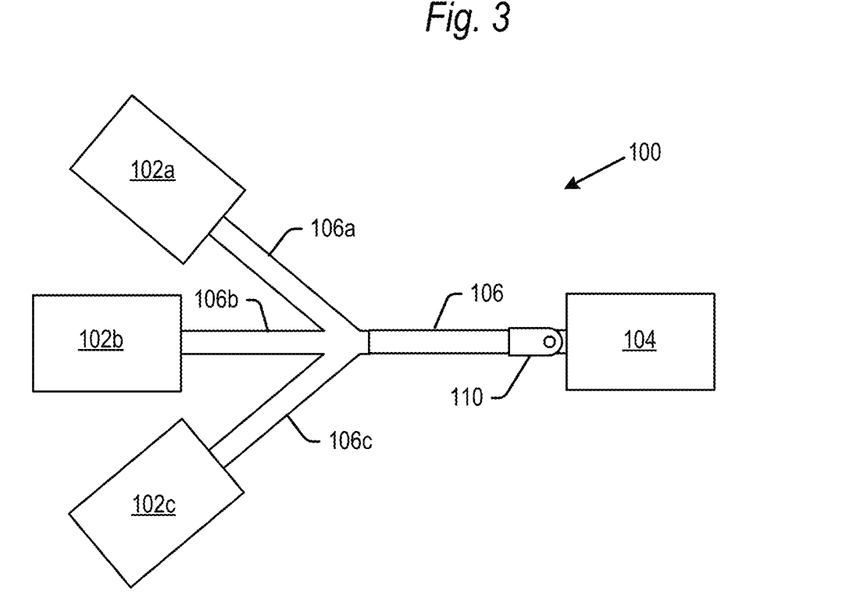
FIGS. 3-5 are alternative embodiments of a strut having a passively damped end fitting.
Figure 4:
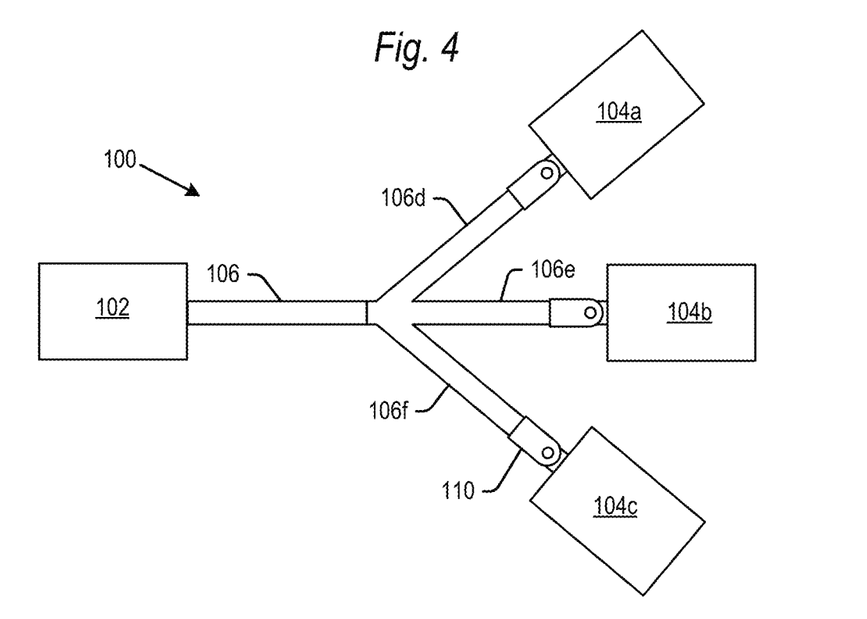

FIGS. 1 and 2 illustrate strut 106 as being a single straight tube extending between structural elements 102 and 104. Strut 106 may have other configurations in further embodiments. For example, FIG. 3 shows a strut 106 having multiple legs 106a-106c connected to multiple structural elements 102a-102c. The legs 106a-106c come together at some point along their length so that a single strut having a single and fitting 110 affixes to payload 104. The legs 106a-106c may reside in the same or different planes. As a further example, FIG. 4 shows a strut 106 having multiple arms 106d-106f connected to multiple payloads 104a-104c by multiple end fittings 110. The arms 106d-106f stem from a single strut 106 connected to structural element 102. The arms 106d-106f may reside in the same or different planes.

Figure 5:
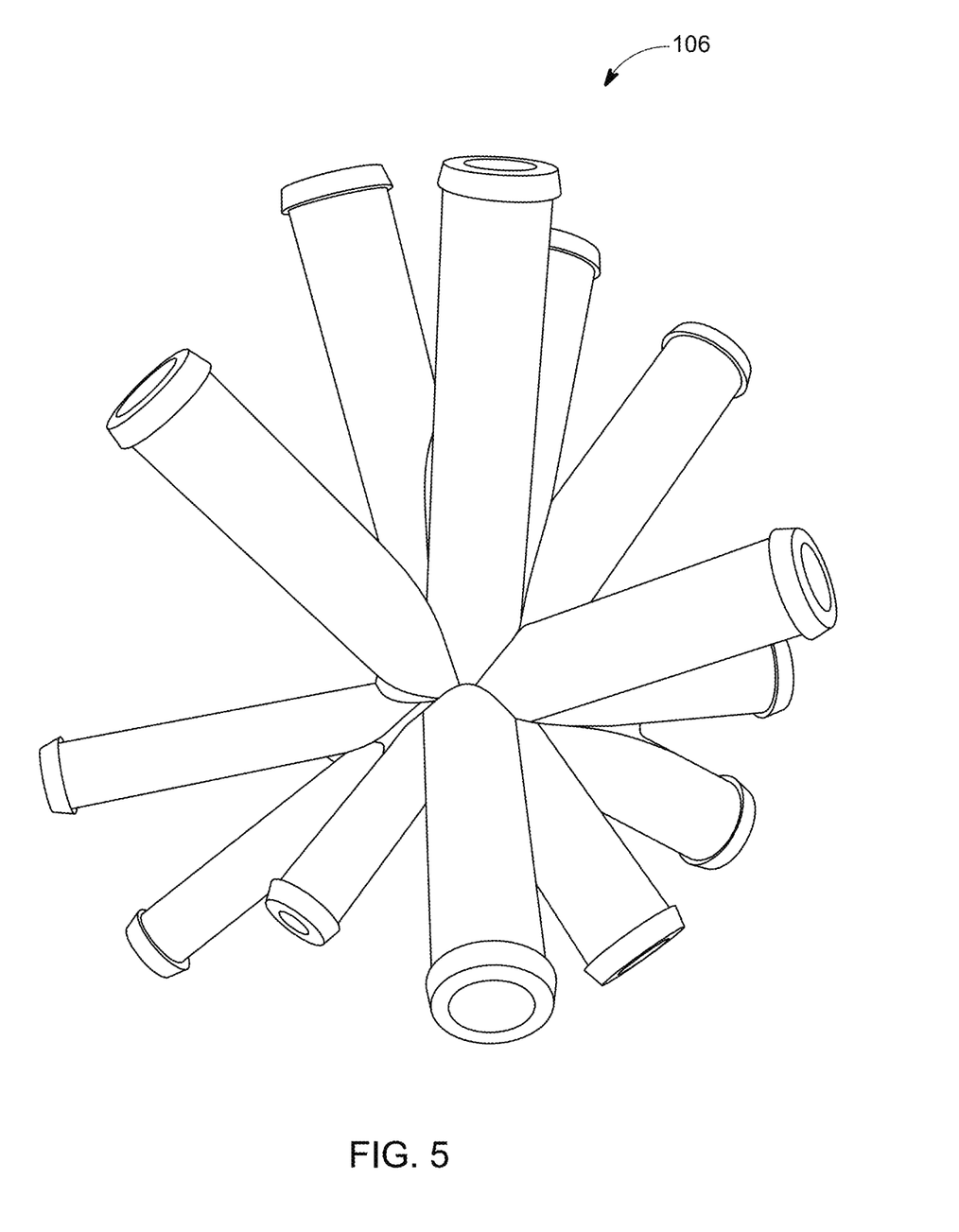

FIG. 5 shows a further example of a multi-tube strut with a central nucleus off of which extend a number of tubes. The tubes may be affixed at the nucleus by a variety of affixation methods, including for example welding. Although not shown, each of the tubes may be connected to a structural element 102 (subject to forces) or a payload (isolated from forces). Some or all of the tubes may include an end fitting 110 (not shown in FIG. 5), as explained above and below, at the exposed end of the tube for affixation to a structural element 102 or payload 104. In embodiments, the end fitting 110 may be printed in an additive manufacturing process so that the end fitting 110 is built into one or more of the tubes. The end fitting 110 may additionally be printed into one or both ends of strut 106 in any of the embodiments described herein. The example shown in FIG. 5 is by way of illustration only, and there may be more or less tubes, and each tube may be shorter or longer, in further embodiment. Other examples of further configurations of strut 106 are contemplated.

Figure 6:
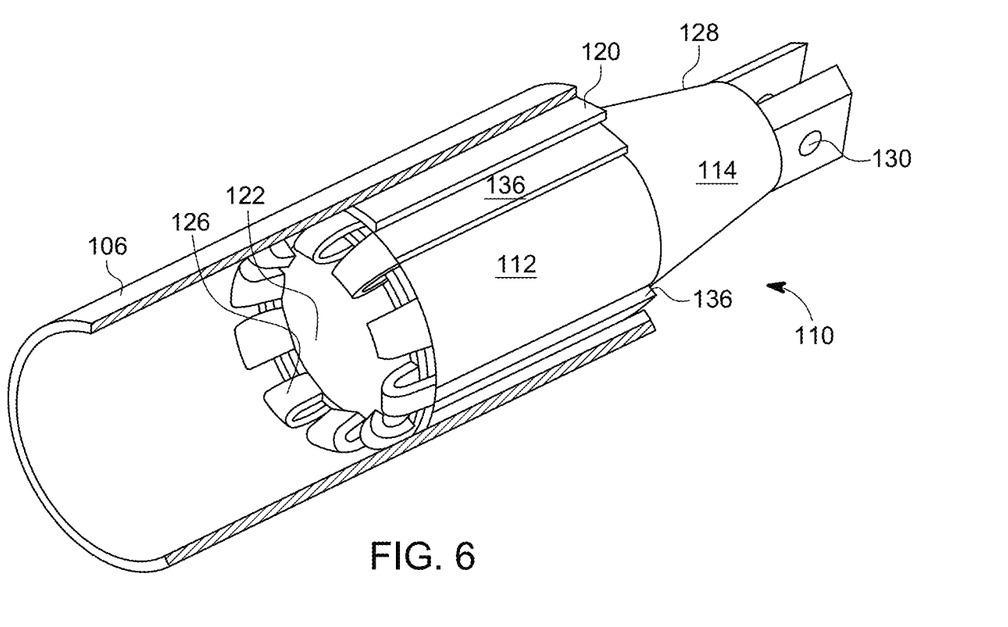
FIG. 6 is a perspective view of a passively damped end fitting.
Figure 7:
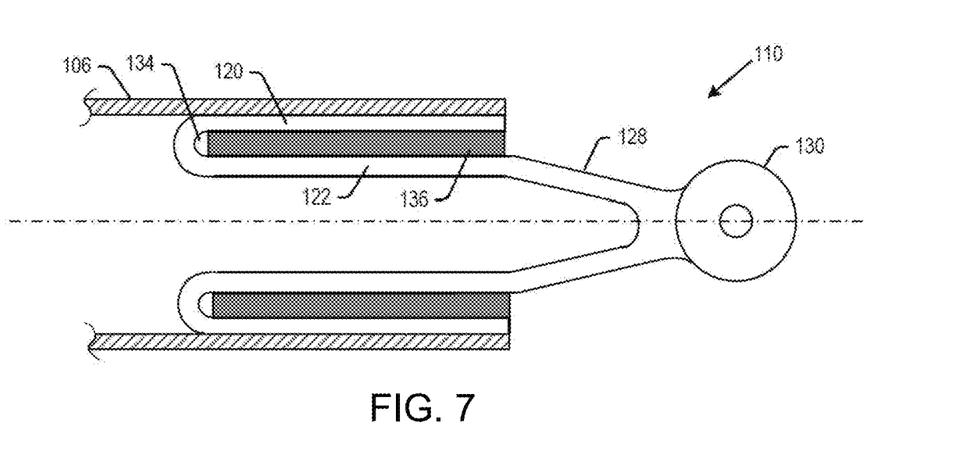
FIG. 7 is a cross-sectional view of a passively damped end fitting.

FIGS. 6 and 7 illustrate perspective and cross-sectional views of an end fitting 110 affixed at one end of a strut 106. In general, the end fitting 110 may have a proximal section 114 affixed within the end of the strut 106, and a distal section 116 extending from an end of the strut 106 for coupling the end fitting 110 to the payload 104. The proximal section is formed of an outer cylindrical hub 120 and an inner cylindrical hub 122 within and concentric with the outer cylindrical hub 120. The inner and outer cylindrical hubs are connected to each other by a castellated flexure mount 126 as shown. The distal section 116 includes a neck 128 and a pin mount 130 for receiving a pin when coupled to a payload 104.

The spaces between the castellations in flexure mount 126 may be about ½ the arc length of the castellations, though these spaces may be smaller or larger in further embodiments. The circular portion of the flexure mount 126 is sized with a radius to provide a cylindrical space 134 between the inner and outer cylindrical hubs 120, 122. In accordance with aspects of the present technology, at least portions of the cylindrical space 134 may be filled with a viscoelastic material (VEM) 136. As explained below, VEM 136 may be provided to dampen vibration and shock loads exerted on the end fitting from the strut 106, as well as providing a second load transmission path from the proximal section 114 to the distal section 116.

In one embodiment, the VEM may be Appli-Thane® 7125 from Appli-Tec, Inc., Salem, N.H., but other thermosetting polyurethane, nylon or plastic viscoelastic materials may for example be used. The VEM 136 may be injected into space 128 as an A-stage liquid or foam, and thereafter cured to a C-stage solid, where the VEM 136 at least partially fills space 128 and adheres to both the inner and outer cylindrical hubs 120, 122. As noted below, the properties of the VEM 136 may be selected to get the optimal damping response. However, in one embodiment, once cured, the VEM 136 may have a tensile modulus of 1646 MPa, a density of 1002 Kg/m$^3$ and a Poisson ratio of 0.34. These values are by way of example only and may vary in further embodiments. As explained hereinafter, the selection of the VEM, as well as the pattern with which the VEM is applied may be selected to tune the damping and load response of the end fitting 110 as needed or desired during testing and implementation of the system 100.

The outer cylindrical hub 120 may be fixedly attached to an inner diameter of the strut 106 end, as by welding, bolting, high strength adhesive and/or other adhering mechanism. Vibrational, shock, torsional and compressive loads exerted axially on strut 106 are transmitted to the outer cylindrical hub 120. From there, some of these loads (vibration and shock) are damped by both the flexure mount 126 and the VEM 136. As explained below, the properties of the VEM 136 may be selected to optimize damping at resonant frequencies of the end fitting 110 and/or system 100. Vibrational and shock energy is transmitted from the outer cylindrical hub 120 as shear forces into the VEM 136, which dissipates the energy as heat.

Figure 8:
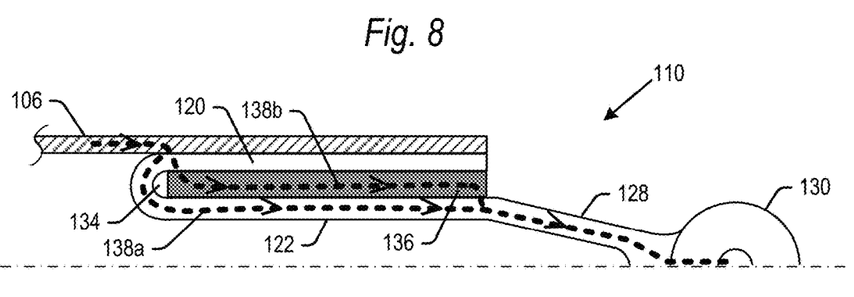
FIG. 8 is view illustrating the dual force transmission flow path through a section of a passively damped end fitting.

Some of the loads on the outer cylindrical hub 120 (e.g., tensile and compressive loads) are transmitted through the proximal section 114 to the distal section 116 of the end fitting 110. In accordance with a further aspect of the present technology, provision of the VEM 136 provides a second load transmission path for transferring these loads. As shown in FIG. 8, a load on the strut 106 (in this case a compressive load) is transmitted along a first path 138a through the outer cylindrical hub 120, flexure mount 126 and inner cylindrical hub 122 to the distal section 116. This same load on strut 106 is also transmitted along a second path 138b, through the outer cylindrical hub 120, VEM 136 and inner cylindrical hub 122 to the distal section 116.

The VEM 136 takes the load from the outer cylindrical hub 120 as shear load, and transfers at least part of the load to the distal section 116 via the inner cylindrical hub 122. Part of the load may be dissipated as heat. While the hub 120, hub 122 and space 134 are referred to herein "cylindrical," it is understood that these components may be referred to more generally as the outer hub 120, inner hub 122 and space 134, for example in embodiments where the cross-sectional shape of the end fitting is not circular.

Having a dual load transmission path for load transfer provides benefits of reducing stress and strain on the flexure mount 126 and the inner cylindrical hub 122. A further benefit of the dual load transmission path is that it allows tuning of the stiffness vs. damping of the system. In other words, in order to get damping, there needs to be shear loads in the VEM 136. This results in some loss of stiffness. The flexures help to tune the stiffness loss to remain above a required stiffness while still allowing some load to go through the VEM and provide damping.

Figure 9:
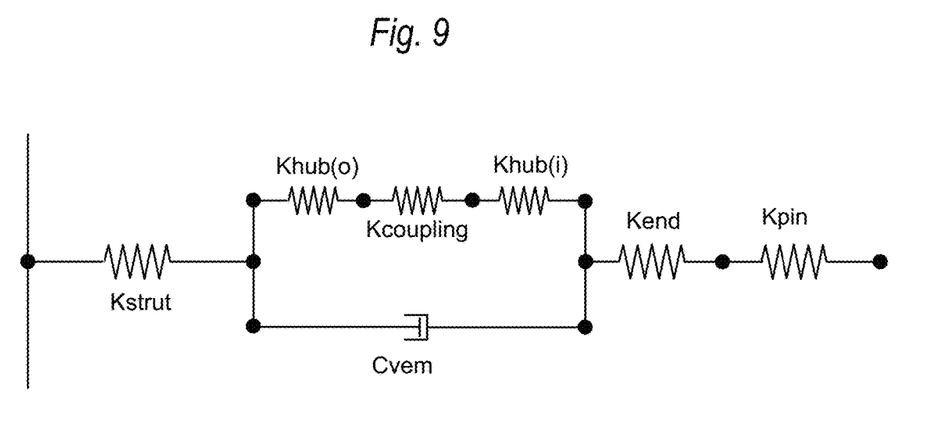
FIG. 9 is a schematic representation of force transmission through the section of the passively damped end fitting shown in FIG. 8.

FIG. 9 shows the mechanical elements of the end fitting 110 modeled as springs and a damper. The loading elements are modeled as springs having a spring coefficient, k. The VEM damper is modeled as a damper with a damping coefficient, c. The strut ($k_{strut}$) loads the outer cylindrical hub ($k_{hub(o)}$), which in turn loads the coupling mount ($k_{coupling}$) and the inner cylindrical hub ($k_{hub(i)}$). The spring response of these elements is damped by VEM ($c_{VEM}$). The resultant forces are communicated the neck ($k_{neck}$) and then to the pin mount ($k_{pin}$), where the end fitting transfers the load to the payload 104. Loads can also flow along the dual pathway in the opposite direction.

In addition to the advantages of the damping and dual load path, use of the VEM 136 provides a further advantage in that the VEM 136 can be added to the cylindrical space 134 during assembly or test of system 100. In particular, when strut 106 is connected between the structural element 102 and payload 104 in system 100, it may turn out that, contrary to design indications, the payload 104 is subject to non-optimal loads or levels of vibration at certain frequencies. At that point, the end fitting 110 can be redesigned using for example additive manufacturing and/or a particular VEM 136 (having the desired damping properties) can be injected into and/or removed from the cylindrical space 134 in the end fitting 110 to tune the vibration damping and/or response to shock loads.

Various methods are known for optimizing the load bearing and damping response within a mechanical structure including VEM 136, including for example the Genetic Algorithm (Boucher, M. A., Smith, C. W., Scarpa, F., Rajasekaran, R. & Evans, K. E., "Effective Topologies For Vibration Damping Inserts In Honeycomb Structures," *Composite Structures* 106, 1-14 (2013)); Moving Asymptotes method (Zheng Linga, X. R., Yi, W. & El-Sabbagh, A., "Topology Optimization Of Constrained Layer Damping On Plates Using Method Of Moving Asymptote (MMA) Approach," *Shock and Vibration* 18, 221-244 (2011)); Topology Optimization method (Yi-Cheng Chen, "An Optimal Placement of CLD Treatment For Vibration Suppression Of Plates," *International Journal of Mechanical Sciences* 44, 1801-1821 (2002)); modal strain energy method (Kienholz, C., "Finite Element Prediction Of Damping In Structures With Constrained Viscoelastic Layers," *AIAA Journal* 20, 1284-1290 (1982)); and Double Shear Lap-Joint-configuration (Madeira, J. F. A., Araújo, A. L., Soares, C. M. M., Soares, C. A. M. & Ferreira, A. J. M., "Multiobjective Design Of Viscoelastic Laminated Composite Sandwich Panels," *Composites Part B: Engineering* 77, 391-401 (2015)). Each of these publications are incorporated by reference herein in their entireties.

In one embodiment, the VEM 136 may be injected around the entire circumference of the cylindrical space 134. In further embodiments, it may be found that optimal damping and/or shock load reduction is achieved by injecting the VEM 136 in strips around the circumference of the cylindrical space 134 (as shown in FIG. 6). The strips may be parallel to a central axis of the end fitting, or wrapped around the inner hub 122 at an angle (including up to 90°). Again, these features further allows technicians to tune the vibration and load response of system 100 during assembly or test. As noted in the Background section, this is a significant advantage over conventional systems in which vibration and shock load concerns are addressed early in the design phase process, without a feasible method of making changes during the later assembly and test phases.

Figure 10:
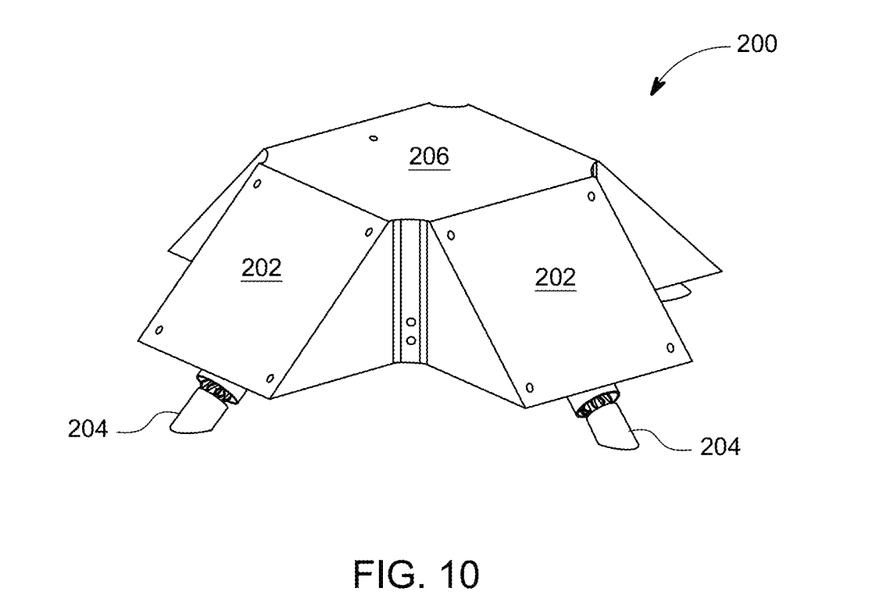
FIG. 10 is a perspective view of a bracket including integral repeating patterns of flexures and parallel shear planes for which in inject a VEM for supporting a number of momentum wheels.
Figure 11:
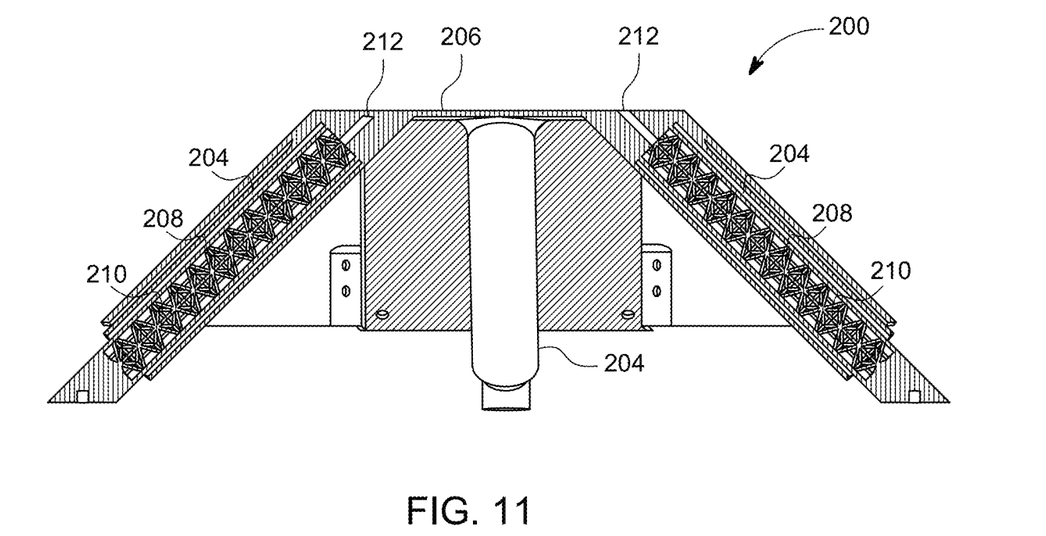
FIG. 11 is a cross-sectional view of the bracket of FIG. 10 showing an internal lattice section within the bracket.
Figure 12:
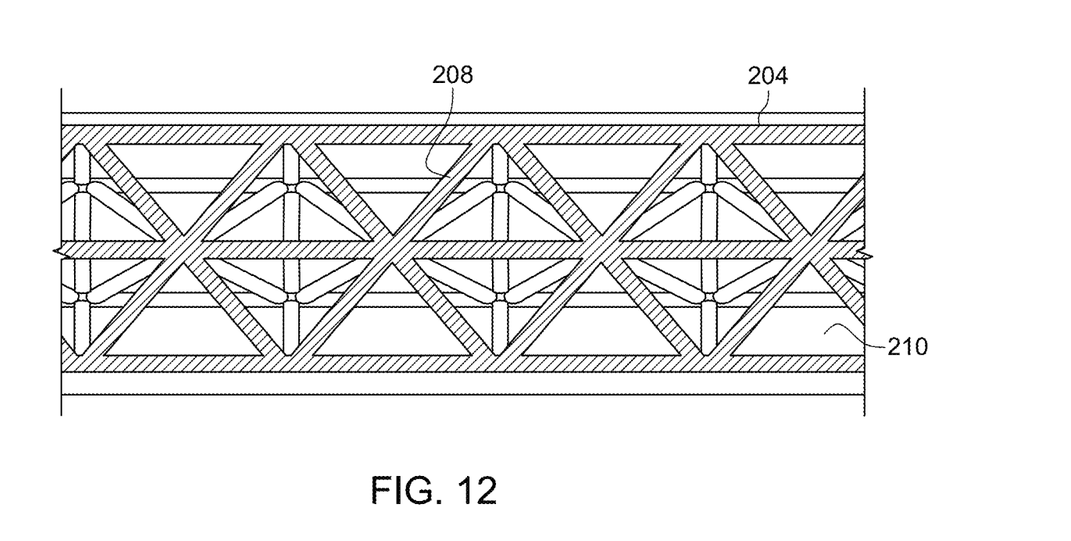
FIG. 12 is an enlarged cross-sectional view of the lattice section of FIG. 11.

FIGS. 10-12 relate to a further embodiment of the present technology for managing vibration and/or shock load on a bracket 200. Bracket 200 (which may be an example of a payload 104) may include sensitive components and/or instrumentation which are desirably isolated from vibration and/or shock loads. In one example, bracket 200 may include a number of surfaces 202 (four in the example shown) to which momentum wheels (not shown) may be mounted. Other components and instrumentation are contemplated. The bracket 200 may also have an upper surface 206 to which components and/or instrumentation may be mounted. Bracket 200 may have other surfaces, and other configurations, for receiving sensitive components and/or instrumentation.

The bracket 200 may be mounted to a support surface (not shown), such as for example structural element 102 described above, using a number of legs 204. In the embodiment shown, there may be for cylindrical legs 204 affixing the bracket 200 to the structural element 102. There may be more or less than four legs 204 in further embodiments, and legs 204 may have other cross-sectional shapes in further embodiments, including for example square, rectangular, triangular and oval.

FIG. 11 is a cross-sectional view through bracket 200, including through a pair of the opposed legs 204. As shown, the legs 204 may extend up into the bracket 200, near to or at the upper surface 206 of the bracket. The cross-sectional view shows a hollow interior of legs 204 that is filled with a lattice structure 208 and a VEM 210 injected and cured around the lattice structure 208. Greater detail of the lattice structure 208 and VEM 210 in one section of a leg 204 is shown in FIG. 12.

Lattice structure 208 may be formed of lightweight components assembled into a lattice of repeating truss structures extending through a portion or all of each of the legs 204. Each truss structure may for example have a tetrahedral core of joined crosspieces, but other assemblies are contemplated including for example 3D Kagome, octahedral, hexagonal or pyramidal truss structures. The crosspieces may for example be formed of titanium, but other materials are possible. Such lattice structures are lightweight but impart a relatively high stiffness and yield strength to legs 204. The lattice structure 108, by itself, may have poor vibration damping at resonant frequencies.

In order to address this, VEM 210 may be injected into each of the legs, for example through ports 212 in surface 206. The VEM 210 may be injected as an A-stage liquid or foam, along a length of a leg 204. The length of the column of injected VEM 210 may be the entire length of a leg 204, or a portion of the length of a leg 204. The VEM 210 in embodiments is injected to take up the entire cross-sectional area along the column length, surrounding and engaging the repeating truss structures of the lattice structure 208. After injection, the VEM 210 may be cured to a C-stage solid. VEM 210 may have the same or different properties as the VEM 136 discussed above.

In addition to the advantages of the damping, use of the VEM 210 provides a further advantage in that the VEM 210 can be selectively added to the interior of legs 204 during assembly or test of the components or instrumentation mounted to bracket 200. In particular, when the components/instrumentation are mounted on bracket 200, and bracket 200 is mounted to the structural element 102, it may turn out that, contrary to design indications, the bracket 200 is subject to non-optimal loads or levels of vibration at certain frequencies. At that point, the legs 204 can be replaced with other legs with a different lattice structure 208 and/or VEM (having the desired damping properties). Instead of replacing legs 204, VEM 210 can be injected into and/or removed from one or more legs 204 to optimally tune the vibration damping and/or response to shock loads.

The legs 204 including lattice structure 208 and VEM 210 are designed to balance optimal load bearing and vibration damping requirements with minimum weight requirements. The legs 204 and lattice structure 208 within the legs are designed with a high strength and modulus of elasticity to carry tensile, compressive, torsional and bending (moment) forces exerted on legs 204 by the structural element to which the legs are mounted. The VEM 210 absorbs vibration and shock, exerted as shear within the VEM 210, and dissipates this energy as heat.

Various methods are known for optimizing the load bearing and damping response within bracket 200 including legs 204 with lattice structure 208 and VEM 210. Such methods are described for example in Wang, R., Shang, J., Li, X., Luo, Z. and Wu, W., "Vibration And Damping Characteristics of 3D Printed Kagome Lattice With Viscoelastic Material Filling," *Sci Rep* 8, 9604 (2018)), which publication is incorporated herein by reference in its entirety. The methods described in the above-incorporated publications may be also be used.

When optimizing the load and vibration damping response of bracket 200, various parameters may be controlled and adjusted as needed, using for example additive manufacturing, including the following:

the number of legs 204;
the length and cross-sectional area of legs 204;
the wall thickness and type of material used for legs 204;
the configuration of the repeating truss structures in the lattice structure 208 (tetrahedral, 3D Kagome, octahedral, hexagonal, etc.);
the length and cross-sectional area of the crosspieces in each truss structure of lattice structure 208;
the angle of the crosspieces in each truss structure relative to the central axis of the leg 204;
the type and properties of VEM 210;
the pattern in which the VEM 210 is applied;
the length of the VEM 210 column in leg 204.

In embodiments, the VEM 210 may be isotropic, exhibiting a uniform damping response in all directions. However, in further embodiments, the properties of the VEM and/or the pattern with which the VEM is applied, may result in an anisotropic response of VEM 210, exhibiting greater damping for vibrations applied in a given direction than for vibrations applied in other directions. Again, the damping response of VEM can be tuned to optimize anisotropic damping in both end fitting 110 and within legs 204, for example where vibration occurs more prevalently along one or more specific axes.

Figure 13:
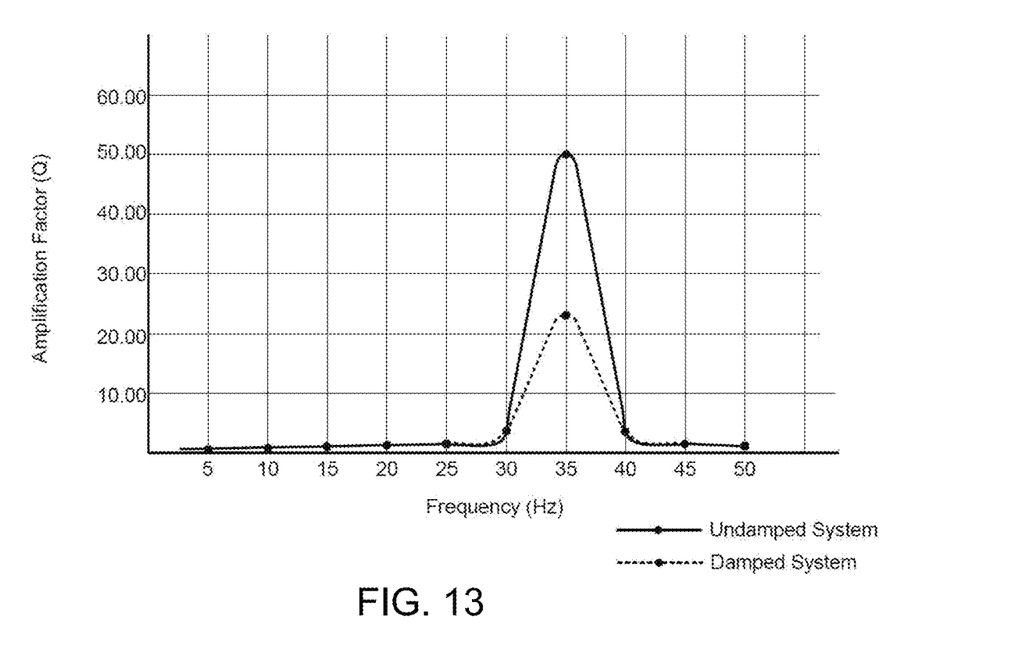
FIG. 13 is a graph illustrating advantages of the passive damping system over a conventional, un-damped system

FIG. 13 is a graph of vibration amplification factor (Q) for different vibrational frequencies for the end fitting 110 and/or a leg 204 for both damped (including VEM) and undamped (not including VEM) structures. In this example vibrational resonance occurs at around 35 Hz. As shown, the VEM reduces the amplification factor Q by about half This is a significant reduction in vibration.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A passively damped end fitting configured to be mounted on an end of a strut connected between a structural element and a payload, the end fitting comprising:
    a proximal section configured to fit within an end of the strut and a distal section configured to be coupled to one of the structural element and payload, the proximal section comprising:
        an outer hub configured to connect to an end of the strut, the outer hub having a first end and a second end,
        an inner hub positioned within an interior of the outer hub and connected to the distal section, the inner hub having a first end and a second end,
        a flexure mount physically connecting the first end of the inner hub to the first end of the outer hub, and the flexure mount defining a space between the inner and outer hubs, the flexure mount defining a first load transmission path between the outer hub and the inner hub and
        a viscoelastic material (VEM) within at least portions of the space and adhered to at least portions of the inner and outer hubs, the VEM defining a second load transmission path between the outer hub and the inner hub.

2. The passively damped mechanical structure of claim 1, wherein the VEM dissipates vibrational energy from the outer hub and prevents at least a portion of the vibrational energy from reaching the inner hub.

3. The passively damped mechanical structure of claim 1, further comprising a dual load transmission path through the proximal section.

4. The passively damped mechanical structure of claim 3, wherein a first of the dual load transmission paths comprises the outer hub, the flexure mount and the inner hub, and wherein a second of the dual load transmission paths comprises the outer hub, the VEM and the inner hub.

5. A passively damped mechanical structure, comprising:
    a structural element;
    a payload; and
    a strut extending between and connecting the structural element to the payload, the strut comprising an end fitting, the end fitting comprising a proximal section within an end of the strut and a distal section coupled to one of the structural element and payload, the proximal section comprising:
        an outer hub connected to an end of the strut,
        an inner hub connected to the distal section,
        a flexure mount configured to flex, the flexure mount physically connecting the inner and outer hubs and defining a space between the inner and outer hubs; and
        a viscoelastic material (VEM) within at least portions of the space and adhered to at least portions of the inner and outer hubs.

6. The passively damped mechanical structure of claim 5, wherein the VEM dissipates vibrational energy from the outer hub and prevents at least a portion of the vibrational energy from reaching the inner hub.

7. The passively damped mechanical structure of claim 5, further comprising a dual load transmission path through the proximal section.

8. The passively damped mechanical structure of claim 7, wherein a first of the dual load transmission paths comprises the outer hub, the flexure mount and the inner hub, and wherein a second of the dual load transmission paths comprises the outer hub, the VEM and the inner hub.

9. The passively damped mechanical structure of claim 5, wherein the end fitting is cylindrical, and the outer hub, inner hub and space comprise an outer cylindrical hub, and inner cylindrical hub and cylindrical space, respectively.

10. The passively damped mechanical structure of claim 5, wherein the inner hub is concentric with the outer hub.

11. The passively damped mechanical structure of claim 5, wherein the flexure mount is castellated.

12. The passively damped mechanical structure of claim 5, wherein the VEM is applied continuously around a circumference of the space.

13. The passively damped mechanical structure of claim 5, wherein the VEM is applied in strips around a circumference of the space.

14. The passively damped mechanical structure of claim 13, wherein the VEM strips are parallel to a central axis of the end fitting.

15. The passively damped mechanical structure of claim 5, wherein the end fitting is directly connected between the strut and the payload.

16. The passively damped mechanical structure of claim 5, wherein the end fitting is directly connected between the strut and the structural element.

17. The passively damped mechanical structure of claim 1, wherein the flexure mount is castellated.

* * * * *